United States Patent [19]

Shukla et al.

[11] 3,901,655

[45] Aug. 26, 1975

[54] URINE TOXICOLOGY CONTROL

[75] Inventors: Ravindra Shivprasad Shukla, Monsey, N.Y.; Joseph Diago Pinto, Ridgewood, N.J.

[73] Assignee: American Cyanamid Company, Stamford, Conn.

[22] Filed: Dec. 26, 1973

[21] Appl. No.: 428,564

[52] U.S. Cl. .............................. 23/230 B; 252/408
[51] Int. Cl. ............................................ G01n 33/16
[58] Field of Search ........ 23/230 B, 253 R; 252/408

[56] References Cited
UNITED STATES PATENTS
3,625,652  12/1971  Fujimoto ........................... 23/230 B

OTHER PUBLICATIONS

H. B. Friedgood et al., Science, 105, 99–100, (1967).

*Primary Examiner*—Morris O. Wolk
*Assistant Examiner*—Sidney Marantz
*Attorney, Agent, or Firm*—Jack W. Richards

[57] ABSTRACT

A lyophilized pooled normal human urine control for use in drug screening and analysis of human urine for drugs, which control is prepared from pooled normal human urine by treating said urine with a styrene-divinylbenzene copolymer resin to remove contaminants which interfere with said analysis followed by the addition of known amounts of drugs to the purified or contaminant free urine.

6 Claims, No Drawings

URINE TOXICOLOGY CONTROL

BACKGROUND OF THE INVENTION

This invention is concerned with drug-free normal human urine wherein drugs and/or other contaminants which would interfer with drug screening analysis have been removed by treatment with a neutral or non-ionic resin such as a styrene-divinylbenzene copolymer, e.g., Amberlite XAD-2 resin[1], and to which has been added known amounts of specific drugs to provide a urine control for use in the screening and quantitative analysis of human urine for drugs and/or their metabolites. Removal of contaminants is achieved without removal of urinary pigments, protein, salts and other more common urinary components.

[1] A commercially available resin made by Rohm and Haas Co. and sold under the aforementioned trade name. A neutral non-ionic resin consisting of macroreticular beads of styrene-divinylbenzene copolymer resin. For a detailed discussion of Amberlite XAD-2, see I & EC Product Research and Development, Vol. 7, No. 2, pp. 107-115 (June, 1968) and Rohm & Haas Co., Technical Bulletin Ion Exchange Department (undated).

The purpose of the invention is to prepare a normal human urine control containing known amounts of drugs free of contaminants, such as nicotine and caffeine, which interfer with drug screening and analysis of urine. The principle of preparing the urine toxicology control set forth herein can also be extended to the preparation of both normal and abnormal urine controls which are useful in the clinical laboratory for clinical determination such as steroid analysis. The invention finds its usefulness in medical-clinical laboratories, pharmaceutical and chemical companies, chromatography companies, instrument companies and others.

It is known to use ion exchange resins to separate components from body fluids, including human urine. U.S. Pat. No. 3,345,138 discloses using an ion exchange resin (Amberlite OG-50) to remove interfering calcium and magnesium ions from human urine. U.S. Pat. No. 3,682,835 discloses treating blood serum with an ion exchange resin such as Amberlite IR-120 to reduce the sodium, potassium and calcium level in the serum. However, these patents which mention the use of ion exchange resins for separation of components from urine or blood media involve a different procedure and utility from that disclosed herein. Amberlite XAD-2 is not an ion-exchange resin but a neutral resin. The process of removal of compounds such as nicotine and caffeine from urine in the practice of the present invention is one of adsorption and not ion exchange.

U.S. Pat. No. 3,625,652 describes a procedure whereby urine containing narcotics and amphetamines can be examined for the presence of these drugs. The '652 patent is concerned with the separation of drugs from human urine by adsorption of the drugs on Amberlite XAD-2 resin and subsequent elution therefrom. After elution the eluate is analyzed for drugs according to known procedures. In contrast, the present invention is concerned with: (1) freeing or cleaning up urine from various compounds that might interfere in drug detection; and (2) the preparation of a product essentially free of interfering substances to which is added pure drugs such as barbiturates, amphetamines and alkaloids which can be used as a urine toxicology control. The product of this invention is used as a reference material, a urine control in the clinical laboratory, to assist the user in detecting drugs in patient's urine. Detection is based on the user submitting the control standard to the same chemical steps as the patient's specimen. The user of the product need not necessarily subject the product or his patient's urine to an Amberlite XAD-2 column to identify the drugs as there are other alternatives such as liquid-liquid extraction popularized by Davidow[2] and SA-2 paper treatment recommended by Dole[3] usable with the control of this invention.

[2] American Journal of Clinical Pathology, 50, No. 6, pp. 714-719 (1968). [3] JAMA, 198, No. 4, pp. 115-118 (1966).

U.S. Pat. No. 3,567,029 also uses Amberlite XAD-2 resin to adsorb drugs from urine, but the '029 patent is not concerned with nor does it make disclosure of, the preparation of purified human urine and the addition of known amounts of drugs thereto to provide a control for drug detection.

SUMMARY OF THE INVENTION

According to the present invention, purified human urine free of contaminants is prepared by collecting human urine in a container containing a suitable bactericide; continuously mixing the resultant solution with a neutral, non-ionic styrene-divinylbenzene copolymer resin such as Amberlite XAD-2, Amberlite XAD-1 and Amberlite XAD-4, which has been treated as disclosed hereinafter, in the ratio of about 5 grams resin per 100 parts urine for about one-half hour; separating the resin treated urine from the resin; and filtering the separated urine through an infusorial earth bed. It is most desirable that the ratio of resin to urine and the contact time not exceed the above. If the ratio is too high or the time of contact too long, urinary pigments may be removed which change the color of the urine from its yellowish color to a water-white. For a diagnostically elegant control preparation, it is desirable to have a control the yellowish color of normal urine. After the above purification treatment, various drugs at known concentrations are added to the purified urine and the urine lyophilized. The urine is then ready for use as a urine toxicology control for drug screening and analysis according to procedures known in the art.[2,3]

[2] American Journal of Clinical Pathology, 50, No. 6, pp. 714-719 (1968). [3] JAMA, 198, No. 4, pp. 115-118 (1966).

The Amberlites XAD-1, XAD-2 and XAD-4 are neutral non-ionic resins made by Rohm & Haas under the aforementioned trade names and consist of macroreticular beads of styrene-divinylbenzene copolymer resins. These resins have an average pore diameter ranging from 50 to 205 angstrom units and a surface area of 100 to 850 square meters/gram. The XAD-2 styrene-divinylbenzene copolymer resin generally has a surface area of 315 square meters/gram, an average pore diameter of 91 angstrom units and a porosity of 0.43 ml. pore/ml. bead.

The present invention specifically contemplates a method of making a lyophilized pooled normal human urine drug control from pooled normal human urine for use as a control in human urine drug screening and analysis procedures which comprises the steps of: (1) mixing washed Amberlite XAD-2 resin or the like which has been washed with successive washes of methanol and distilled water, preferably with successive washes of methanol, aqueous sodium chloride, aqueous sodium carbonate and distilled water, as set forth hereinafter in detail, together with pooled normal human urine in the ratio of about 5 grams of resin per 100 parts of urine for about one-half hour; (2) separating the resin treated urine from the resin by decantation, and a Buchner funnel with Whatman filter paper of the like; (3) filtering the separated resin treated urine through an infusorial earth bed composed of an infusorial earth material such as Celite, siliceous or diatomaceous earth, fossil flour, kieselguhr, Super-cel, or the like; (4) adding known concentrations of pure drugs to the filtered urine; and (5) lyophilizing the filtered drug containing urine. The step of filtering the urine through an infusorial earth bed such as Celite removes any cloudiness left by the XAD–2 resin treatment and gives a more desirable, acceptable and diagnostically elegant control.

The invention also contemplates a lyophilized pooled normal human urine control standard for use as a control in human urine drug screening and analysis procedures prepared as above and as set forth herein and its water reconstituted product. The invention further contemplates the improvement in human urine drug screening and analysis procedures which is that of using the control prepared as above and set forth herein. The invention also contemplates a diagnostic kit for use as a control in human urine drug screening and analysis procedures chiefly comprising lyophilized pooled normal human urine containing known concentrations of drugs therein prepared by the above method and as set forth herein.

It should be pointed out that the purification method of the present invention is so efficient that it screens out not only nicotine and caffeine but also extraneous, naturally occurring, urinary and amino acids. This means that in using the control as a standard, with for example added amphetamine, the ninhydrin-amphetamine chromatographic band is easily recognized without interference of other bands and provides the clinician with an extremely effective and accurate reference.

The urine toxicology control of the present invention uses pooled normal human urine from which any and all drugs that the donor could possibly have taken have been removed. In a subsequent series of operations known amounts of pure drugs are added to the purified urine. The urine is then freeze-dried and sealed under vacuum. When properly reconstituted, each drug is present in definite quantities. In use, the user merely reconstitutes the freeze-dried urine with distilled water to obtain a control containing known concentrations of specific drugs and puts the control through the same extraction procedure as the patients urine sample.

DETAILED DESCRIPTION OF THE INVENTION

The invention will be more fully explained and illustrated by the following detailed description.

EXAMPLE 1

Urine Collection

Male urine is collected and pooled in plastic or glass containers containing 10 g. of boric acid (10%), as bactericide, per liter of urine collected. It is, of course, preferable to exclude the urine of smokers (nicotine), heavy coffee drinkers (caffeine), people who have had quinine within the last 12 hours those who have had sleeping pills or tranquilizers (primarily phenothiazines) or any cough and cold medications in the last 12–24 hours, and finally those who might have had an antibiotic (especially the tetracyclines) in the last 3–4 days. Whereas most of these compounds will be removed almost 95–100% by the Amberlite XAD–2 resin treatment, depending on their concentrations, a minute amount might not be removed and could result in confusing TLC and GLC patterns. The urine collected in boric acid can be stored up to 3 days in the chillroom. If it is anticipated that it will be used beyond this time, it should be stored frozen.

Washing of Amberlite XAD–2 Resin

Before use, the Amberlite XAD–2 resin is washed to insure that as clean a resin as possible is being used.

1. Place 2500 g. XAD–2 (20–50 mesh) in a large container. Add methanol until the XAD–2 is covered with methanol. Stir for 30–60 minutes. Stirring should be done with an overhead stirrer using a wide blade paddle and using a moderate speed. Let XAD–2 settle and decant off methanol.
2. Pour enough aqueous 5% NaCl over the XAD–2 to cover it and stir for 15 minutes. Decant off and discard the NaCl solution.
3. Pour enough aqueous 1% $Na_2CO_3$ solution over the XAD–2 and stir for 15 minutes. Decant off and discard the $Na_2CO_3$ solution.
4. Wash the XAD–2 resin with two or three successive washes of methanol, as described in Step 1 above.
5. Wash the XAD–2 with three successive washes of glass distilled water, stirring each time 10–15 minutes.

The wet washed resin is now ready to be used to remove contaminants from (i.e., purify) the collected and pooled human urine. Use 50 g. wet resin (with as little water as possible) per liter of urine to be purified. To regenerate the resin follow the above steps 1–5.

Purification of Collected and Pooled Urine with Washed Amberlite XAD–2 Resin To every liter of collected and pooled human urine add 50 g. of washed XAD–2 resin, washed or treated as set forth hereinabove. Stir the urine containing the XAD–2 for about one-half hour. Separate the urine by decantation as soon as possible and filter through Whatman No. 1 filter paper on a Buchner funnel. The urine can be refiltered, if desired. After separation of the urine from the XAD–2 resin, the separated urine is filtered through a Celite bed to remove any cloudiness left by the XAD–2 treatment. Preferably, a thin layer chromatography (TLC) is done on the filtered urine after the Celite filtration, according to known methods, to insure that all drugs (particularly barbiturates, amphetamines, codeine, morphine, demerol and methadone) that might have been present in the collected and pooled urine are indeed removed by the XAD–2 treatment. The TLC chromatogram should also be examined for possible presence of quinine and caffeine. If any of these drugs are still present after the XAD–2 treatment, the XAD–2 treatment is repeated as set forth hereinabove. If none of the drugs mentioned above are present in the XAD–2 treated urine proceed to the next step, namely, addition of the pure drugs.

It is recommended that the urine be put through a final millipore filtration step before addition of the drugs. While this is being done the drugs can be weighed out and solutions can be prepared. It is also recommended that each group of drugs be millipore filtered and aliquots then added aseptically to the filtered urine.

Preparation of Urine Toxicology Controls

1. Barbiturates (5 μg./ml. of urine).

Weigh out as accurately as possible 250 mg. each of phenobarbital, secobarbital and amobarbital and transfer to a 25 ml. volumetric flask. Add 10–15 ml. methanol to dissolve the drugs and q.s. to 25 ml. with methanol. This solution contains 10 mg./ml. of each barbiturate. Add 10 ml. of this barbiturate stock solution to 20 liters of XAD–2 purified urine. The concentration of each barbiturate is then 100 mg./20 liters or 100,000 μg./20,000 ml. or 5 μg./ml.

2. Amphetamines (5 μg./ml. of urine)

Weigh out 340 mg. of amphetamine sulfate. This corresponds to 250 mg. amphetamine. Weigh out 311 mg. of methamphetamine-HCL. This corresponds to 250 mg. methamphetamine. Place the 340 mg. amphetamine-$SO_4$ and 311 mg. metamphetamine-HCL in 25 ml. volumetric flask. Add 10 ml. methanol to dissolve and q.s. to 25 ml. This solution now contains 250 mg. each of amphetamine and methamphetamine per 25 ml. or 10 mg./ml. Add 10 ml. of this stock amphetamine-methamphetamine solution to 20 liters XAD-purified. The concentration of each drug is 100 mg./20 liters or 5 μg./ml.

3. Alkaloids (3 μg./ml. of urine)

Weigh out 150 mg. of morphine and transfer to a 25 ml. volumetric flask. Weigh out 65.7 × 3 = 197.1 mg. codeine sulfate and transfer it to the 25 ml. volumetric flask into which the weighed out morphine has been placed. Weigh out 55.9 × 3 = 167.7 mg. methadone-HCl and transfer to the volumetric flask containing codeine and morphine. Weigh out 57.4 × 3 = 172.2 mg. meperidine-HCl and transfer to the 25 ml. volumetric flask containing the morphine, codeine and methadone. Add 10 ml. to 15 ml. methanol to the flask to dissolve the drugs and q.s. to 25 ml. mark. The concentration of each of the drugs codeine, morphine, methadone and meperidine is 150 mg./25 ml. or 6 mg./ml. Add 10 ml. of the above stock solution to 20 liters of XAD-purified urine. The concentration of each drug is 60 mg./20 liters of 3 μg./ml.

The XAD-2 purified urine containing the above drugs in the amounts specified is then aliquoted into 50 ml. vials using a 25.3 ml. vial fill, frozen to −70°C. and lyophilized.

Use of Urine Toxicology Control

Reconstitute each vial prepared as above to the original volume with 25 ml. of distilled water. Add the distilled water and swirl gently to mix. Allow 5 to 10 minutes for complete reconstitution. Mix well before removing a portion for testing assay by the same procedure as used for the analyses of these drugs in unknown urine specimens. The urine toxicology control prepared as set forth herein may be used as a control in any recognized assay method, such as thin-layer chromatography or gas-liquid chromatography, Davidow, B., et al., supra. The concentrations of the controls prepared above, after reconstitution, approximate the following:

| Constituent | Level, μg./ml. |
|---|---|
| Morphine | 3 |
| Codeine | 3 |
| Methadone | 3 |
| Meperidine | 3 |
| Amobarbital | 5 |
| Secobarbital | 5 |

-Continued

| Constituent | Level, μg./ml. |
|---|---|
| Phenobarbital | 5 |
| Methamphetamine | 5 |
| Amphetamine | 5 |

EXAMPLE 2

Urine Collection

Marked one 5 liter glass bottle to 3 liter volume level from outside using a marking tape. Weighed out 30 gm. of boric acid and transferred it to the bottle. Placed one 10 inch funnel on the bottle and added 3 liters of collected and pooled male urine to the bottle. The urine had been stored overnight in the refrigerator.

Washing of Amberlite XAD–2 Resin

One hundred and fifty grams of Amberlite XAD–2 resin (Mallinckrodt) was placed in a 500 ml. beaker, covered with methanol and stirred with a magnetic stirrer for 15 minutes. The methanol was decanted and the methanol wash process repeated twice. The resin was then washed 3 times with distilled water as in the methanol wash. The washed resin was stored overnight in water in a refrigerator. The washed resin was then filtered using Whatman No. 1 filter on Buchner funnel. The wet resin on the funnel was collected and weighed 150 gm.

Purification of Collected and Pooled Urine with Washed Amberlite XAD–2 Resin

The collected and pooled male urine was transferred from the 5 liter glass bottle to 1000 ml. centrifuge bottles and centrifuged for 10 minutes at 2000 rpm. The precipitates were removed by decantation. 150 Gm. of washed resin was added to the decanted urine and the mixture stirred with a magnetic stirrer for 30 minutes. The urine was then filtered using a Buchner funnel and a Whatman No. 1 filter pad. A Celite slurry was prepared by suspending about 50 gm. of Celite in 250 ml. of water. This slurry was then poured over the Whatman No. 1 filter paper. The urine was filtered through the Celite bed filter. Sterile filtration was carried out using a millipore filter unit using filter pads, (1) prefilter, (2) 1.2 μ, (3) 0.65 μ, (4) 0.45 μ and (5) 0.22 μ, pore size pads. Two liters of sterile urine were prepared in this manner for the urine toxicology controls.

Preparation of Urine Toxicology Controls

Stock solutions of amphetamines, barbiturates and alkaloids were prepared as follows:

1. Amphetamines 5(mg./ml.)

| | |
|---|---|
| d-Amphetamine Sulfate | 68 mg. (50 mg. d-amphetamine) |
| d-Metamphetamine Hydrochloride | 62 mg. (50 mg. d-methamphetamine) |
| Methanol q.s. to | 10 ml. |

2. Barbiturates (5 mg./ml.)

| | |
|---|---|
| Phenobarbital | 50 mg. |
| Secobarbital | 50 mg. |
| Amobarbital | 50 mg. |
| Methanol q.s. to | 10 ml. |

3. Alkaloids (5 mg./ml.)

| | |
|---|---|
| Morphine | 50 mg. |
| Codeine Sulfate.5$H_2O$ | 65.7 mg. (50 mg.) Codeine |
| Methadone HCl | 55.9 mg. |

| | -Continued |
|---|---|
| Meperidine HCl | (50 mg.)<br>Methadone<br>57.4 mg.<br>(50 mg.)<br>Meperidine |
| Methanol q.s. to | 10 ml. |

Portions of the stock solutions, prepared as above, were then used to prepare eight urine toxicology controls using XAD–2 treated urine purified as disclosed herein in the concentrations set forth below.

| (i) Urine Toxicology Proficiency Control (UTP) | |
|---|---|
| Amphetamine Stock Solution | 0.1 ml. |
| Barbiturate Stock Solution | 0.1 ml. |
| Alkaloid Stock Solution | 0.2 ml. |
| XAD-2 purified urine q.s. to | 500 ml. |

Each ml. of the UTP control prepared above contains 2 µg./ml. each morphine, codeine, meperidine and methadone, and 1 µg./ml. each amphetamine, methamphetamine, amobarbital, phenobarbital and secobarbital.

| (ii) Urine Toxicology Analytical Control (UTA) | |
|---|---|
| Amphetamine Stock Solution | 0.25 ml. |
| Barbiturate Stock Solution | 0.25 ml. |
| Alkaloid Stock Solution | 0.15 ml. |
| XAD-2 purified urine q.s. to | 250 ml. |

Each ml. of the UTA control prepared above contains 5 µg./ml. each phenobarbital, secobarbital, amobarbital, amphetamine, methamphetamine, and 3 µg./ml. each morphine, codeine, methadone and meperidine.

| (iii) Urine Toxicology Analytical Alkaloid Control (UTAAK) | |
|---|---|
| Alkaloid Stock Solution | 0.3 ml. |
| XAD-2 purified urine q.s. to | 500 ml. |

Each ml. of the UTAAK control prepared above contains 3 µg./ml. each morphine, codeine, methadone and meperidine.

| (iv) Urine Toxicology Proficiency Alkaloid Control (UTPAK) | |
|---|---|
| Alkaloid Stock Solution | 0.1 ml. |
| XAD-2 purified urine q.s. to | 500 ml. |

Each ml. of the UTPAK control prepared above contains 1 µg./ml. each morphine, codeine, methadone and meperidine.

| (v) Urine Toxicology Analytical Amphetamine Control (UTAAM) | |
|---|---|
| Amphetamine Stock Solution | 0.5 ml. |
| XAD-2 purified urine q.s. to | 500 ml. |

Each ml. of the UTAAM control prepared above contains 5 µg./ml. each methamphetamine and amphetamine.

| (vi) Urine Toxicology Proficiency Amphetamine Control (UTPAM) | |
|---|---|
| Amphetamine Stock Solution | 0.2 ml. |
| XAD-2 purified urine q.s. to | 500 ml. |

Each ml. of the UTPAM control prepared above contains 2 µg./ml. each methamphetamine and amphetamine.

| (vii) Urine Toxicology Analytical Barbiturate Control (UTAB) | |
|---|---|
| Barbiturate Stock Solution | 0.75 ml. |
| XAD-2 purified urine q.s. to | 750 ml. |

Each ml. of the UTAB control prepared as above contains 5 µg./ml. each phenobarbital, secobarbital and amobarbital.

| (viii) Urine Toxicology Proficiency Barbiturate Control (UTPB) | |
|---|---|
| Barbiturate Stock Solution | 0.15 ml. |
| XAD-2 purified urine q.s. to | 750 ml. |

Each ml. of the UTAB control prepared above contains 1 µg./ml. each phenobarbital, secobarbital and amobarbital.

Each of the above eight controls were transferred aseptically in 25 ml. volume to 50 ml. sterile clear glass vials. The contents of the vials were lyophilized in a Virtis lyophilizer. The product was freeze-dried at shelf temperature of 25°C. until the product temperature reached 25°C. and allowed to dry for an additional 30 minutes. On completion of drying the vials were sealed and stored in refrigerator.

Use of Urine Toxicology Controls

The lyophilized contents of the above vials were reconstituted with distilled water and satisfactorily subjected to thin layer chromatography for the detection and presence of the added drugs according to TLC procedures known in the art. Quantitative analysis was also done on the products by GLC.

EXAMPLE 3

This example illustrates a urine toxicology control (analytical) in kit form wherein the control can be prepared as set forth in Examples 1 or 2, together with directions for its use.

Description

Pooled normal human urine, freeze-dried, containing nine drugs (6 × 25 ml. vials freeze dried). The concentrations of drugs per vial are morphine 0.075 mg. codeine 0.075 mg., methadone 0.075 mg., meperidine 0.075 mg., amobarbital 0.125 mg., secobarbital 0.125 mg., phenobarbital 0.125 mg., methamphetamine 0.125 mg., and amphetamine 0.125 mg. For use as a single control in appropriate procedures for qualitative and quantitative assays of these drugs in urine specimens.

Directions for Use

Reconstitute each vial to the original volume with 25 ml. of distilled water. Swirl gently to mix and allow 5 to 10 minutes for complete reconstitution. Mix well before removing a portion for testing assay by the same procedure as used for the analyses of these drugs in unknown urine specimens. Any recognized assay method may be used, such as thin-layer chromatography and gas-liquid chromatography. The concentrations after reconstitution approximate the following:

| Constituent | Level, μgm./ml. |
| --- | --- |
| Morphine | 3 |
| Codeine | 3 |
| Methadone | 3 |
| Meperidine | 3 |
| Amobarbital | 5 |
| Secobarbital | 5 |
| Phenobarbital | 5 |
| Methamphetamine | 5 |
| Amphetamine | 5 |

We claim:

1. The method of making a lyophilized normal human urine drug control from pooled normal human urine for use as a control in human urine drug screening and analysis procedures which comprises:
    a. mixing a washed styrene-divinylbenzene copolymer resin and human urine together in the ratio of about 5 grams of resin per 100 ml. of urine for about one-half hour;
    b. separating the resin treated urine from said resin;
    c. filtering the separated resin treated urine through an infusorial earth bed;
    d. adding known concentrations of pure drugs to the filtered urine; and
    e. lyophilizing the drug containing urine.

2. The method of claim 1 wherein the styrene-divinylbenzene copolymer resin is Amberlite XAD–2.

3. The method of claim 1 wherein the infusorial earth bed is Celite.

4. A lyophilized pooled normal human urine drug control for use as a control in human urine drug screening and analysis procedures prepared by the method of claim 1.

5. The lyophilized pooled normal human urine drug control of claim 4, reconstituted by the addition of distilled water.

6. In the performance of human urine drug screening and analysis procedures, the improvement comprising employing in said procedures the reconstituted lyophilized pooled normal human urine drug control prepared by the method of claim 1.

* * * * *